(12) United States Patent
Brancato et al.

(10) Patent No.: US 9,104,235 B2
(45) Date of Patent: Aug. 11, 2015

(54) MODIFYING INFORMATION PRESENTED BY AN AUGMENTED REALITY DEVICE

(71) Applicant: International Business Machines Corporation, Armonk, NY (US)

(72) Inventors: James P. Brancato, Durham, NC (US); Tamera L. Davis, Raleigh, NC (US); Ollie J. Hales, Durham, NC (US); Norberto Molina Olivera, Adjuntas, PR (US)

(73) Assignee: International Business Machines Corporation, Armonk, NY (US)

( * ) Notice: Subject to any disclaimer, the term of this patent is extended or adjusted under 35 U.S.C. 154(b) by 121 days.

(21) Appl. No.: 13/973,126

(22) Filed: Aug. 22, 2013

(65) Prior Publication Data

US 2015/0054726 A1 Feb. 26, 2015

(51) Int. Cl.
*G09G 5/00* (2006.01)
*G06F 3/01* (2006.01)
*G06K 9/62* (2006.01)
*G06T 11/00* (2006.01)

(52) U.S. Cl.
CPC .............. *G06F 3/015* (2013.01); *G06F 3/011* (2013.01); *G06K 9/6202* (2013.01); *G06T 11/00* (2013.01)

(58) Field of Classification Search
CPC .......... G06F 3/011–3/015; A61B 5/00; G02B 27/0093; G02B 27/01–27/0189
USPC .................. 345/8; 359/630–633, 13
See application file for complete search history.

(56) References Cited

U.S. PATENT DOCUMENTS

| | | |
|---|---|---|
| 2008/0317292 A1 | 12/2008 | Baker et al. .................... 382/115 |
| 2009/0167787 A1 | 7/2009 | Bathiche et al. .............. 345/633 |
| 2012/0050044 A1* | 3/2012 | Border et al. ............... 340/573.1 |
| 2012/0137436 A1 | 6/2012 | Andrienko ........................ 5/600 |
| 2013/0009993 A1* | 1/2013 | Horseman ..................... 345/633 |
| 2013/0214998 A1* | 8/2013 | Andes et al. ....................... 345/8 |

FOREIGN PATENT DOCUMENTS

| WO | WO 2012/116059 | 8/2012 | ................. G06F 3/01 |
| WO | WO 2012/122293 | 9/2012 | .............. A63F 13/12 |

* cited by examiner

*Primary Examiner* — Stephen Sherman
(74) *Attorney, Agent, or Firm* — VanLeeuwen & VanLeeuwen; Jeffrey S. LaBaw

(57) ABSTRACT

An approach is provided to control information display at an augmented reality device. In the approach, a biometric value is received from a biometric input device. The biometric input device is a device that receives biometric data from a user of the augmented reality device. The received biometric value is compared to a number of previously established biometric input ranges that correspond to the user. Each of the biometric input ranges corresponds to a different display policy. The comparison identifies a selected display policy. The display detail of the augmented reality device is then automatically set according to the selected display policy.

13 Claims, 6 Drawing Sheets

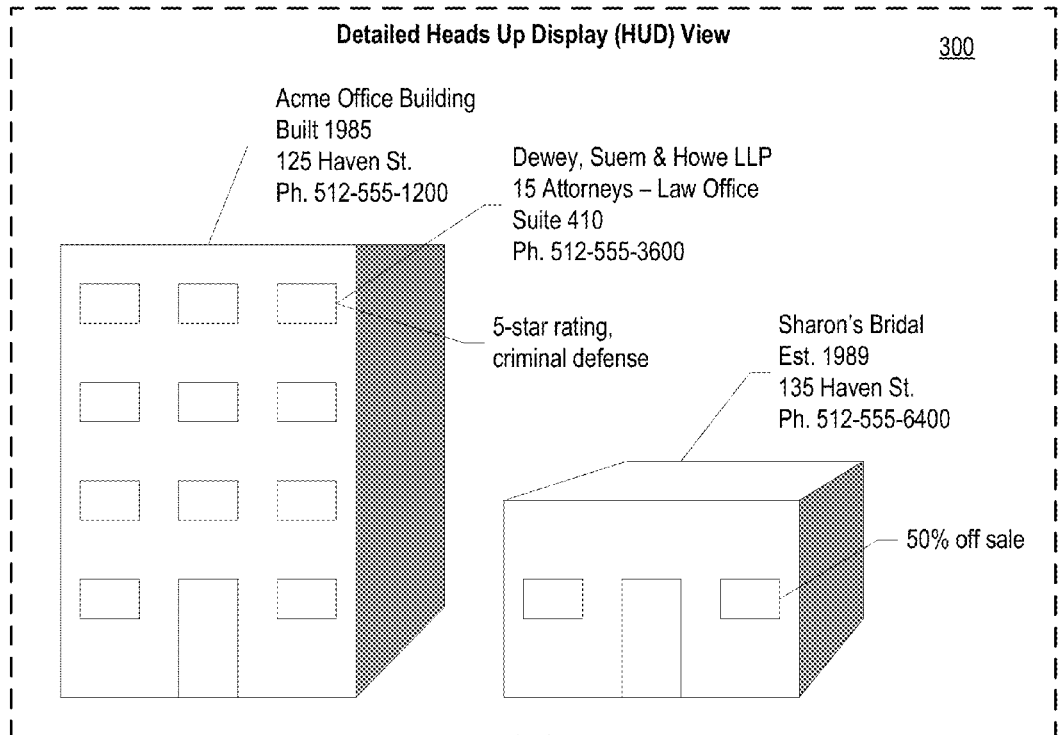
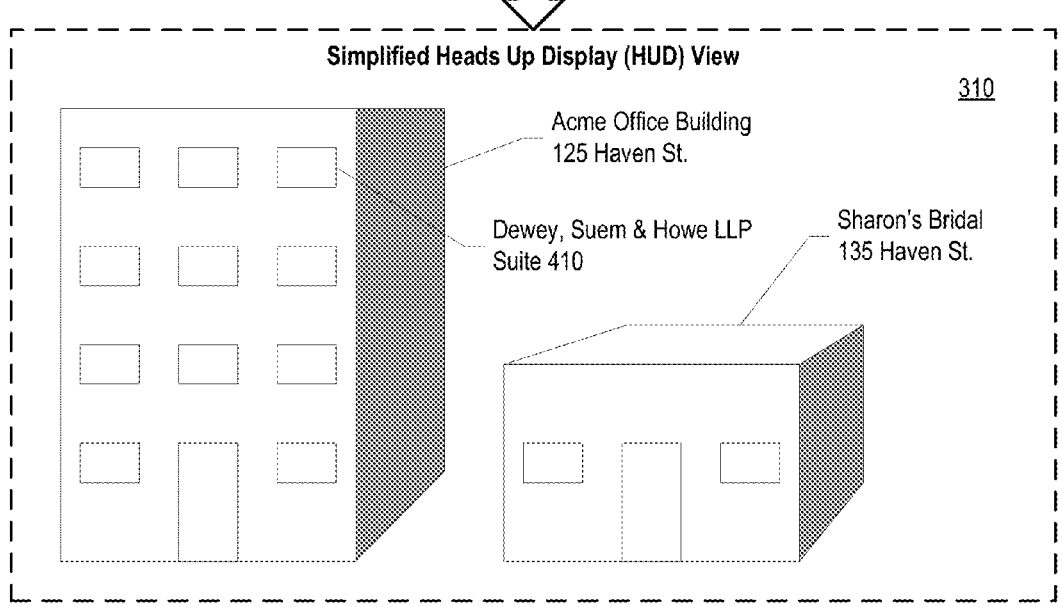
FIG. 3

MODIFYING INFORMATION PRESENTED BY AN AUGMENTED REALITY DEVICE

BACKGROUND OF THE INVENTION

Augmented reality devices provide a user with a live, direct or indirect, view of a physical, real-world environment. The augmented reality device provides the user with additional computer-generated sensory input such as sound, video, graphics or GPS data. Such devices enhance the user's current perception of reality. Augmented reality devices differ from virtual reality devices in that the virtual reality devices replace, rather than supplement, the real world with a simulated one. Augmented reality devices provide real-time data that is contextually relevant with environmental elements. Thus, augmented reality devices can use computer vision and object recognition to provide the information about the surrounding real world of the user. Artificial information about the environment and its objects can be overlaid on the real world using a visual heads-up-display (HUD) system. Augmented reality devices can display a lot of useful information to the user via simple HUD headsets or virtual glass like terminals. However, due to advanced computing power, situations can arise where a user may be overloaded with augmented reality data. For example a situation may arise where a user is driving a car and is lost and unaware of his surroundings. In a traditional environment, the driver might reduce the amount of outside information by lowering the radio volume, terminating a telephone conversation, and exiting the road in order to get their physical bearings. In the same way someone wearing an augmented reality device can become overwhelmed during stressful situations while needing to concentrate on a specific task.

SUMMARY

An approach is provided to control information display at an augmented reality device. In the approach, a biometric value is received from a biometric input device. The biometric input device is a device that receives biometric data from a user of the augmented reality device. The received biometric value is compared to a number of previously established biometric input ranges that correspond to the user. Each of the biometric input ranges corresponds to a different display policy. The comparison identifies a selected display policy. The display detail of the augmented reality device is then automatically set according to the selected display policy.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings, wherein:

FIG. 3 is a depiction of information at an augmented reality device being reduced based on a user's configuration settings;

DETAILED DESCRIPTION

Figure 1:
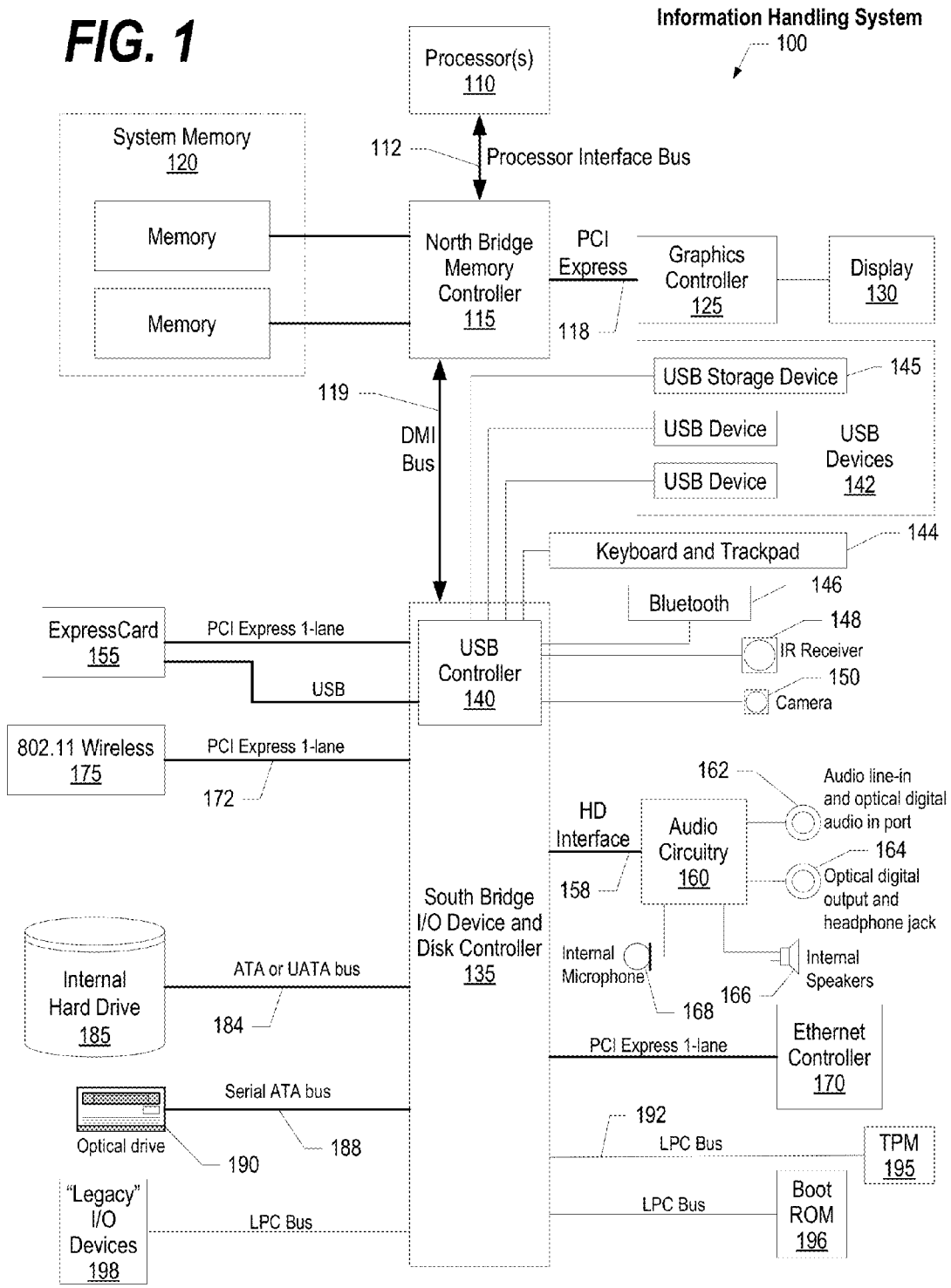
FIG. 1 is a block diagram of a data processing system in which the methods described herein can be implemented.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer, server, or cluster of servers. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

FIG. 1 illustrates information handling system 100, which is a simplified example of a computer system capable of performing the computing operations performed by the augmented reality device described herein. Information handling system 100 includes one or more processors 110 coupled to processor interface bus 112. Processor interface bus 112 connects processors 110 to Northbridge 115, which is also known as the Memory Controller Hub (MCH). Northbridge 115 connects to system memory 120 and provides a means for processor(s) 110 to access the system memory. Graphics controller 125 also connects to Northbridge 115. In one embodiment, PCI Express bus 118 connects Northbridge 115 to graphics controller 125. Graphics controller 125 connects to display device 130, such as a heads-up-display (HUD) visible by a user of the augmented reality device.

Northbridge 115 and Southbridge 135 connect to each other using bus 119. In one embodiment, the bus is a Direct Media Interface (DMI) bus that transfers data at high speeds in each direction between Northbridge 115 and Southbridge 135. In another embodiment, a Peripheral Component Interconnect (PCI) bus connects the Northbridge and the Southbridge. Southbridge 135, also known as the I/O Controller Hub (ICH) is a chip that generally implements capabilities that operate at slower speeds than the capabilities provided by the Northbridge. Southbridge 135 typically provides various busses used to connect various components. These busses include, for example, PCI and PCI Express busses, an ISA bus, a System Management Bus (SMBus or SMB), and/or a Low Pin Count (LPC) bus. The LPC bus often connects low-bandwidth devices, such as boot ROM 196 and "legacy" I/O devices (using a "super I/O" chip). The "legacy" I/O devices (198) can include, for example, serial and parallel ports, keyboard, mouse, and/or a floppy disk controller. LPC bus 192 also connects Southbridge 135 to Trusted Platform Module (TPM) 195. Other components often included in Southbridge 135 include a Direct Memory Access (DMA) controller, a Programmable Interrupt Controller (PIC), and a storage device controller, which connects Southbridge 135 to nonvolatile storage device 185, such as a hard disk drive, using bus 184.

ExpressCard 155 is a slot that connects hot-pluggable devices to the information handling system. ExpressCard 155 supports both PCI Express and USB connectivity as it connects to Southbridge 135 using both the Universal Serial Bus (USB) the PCI Express bus. Southbridge 135 includes USB Controller 140 that provides USB connectivity to devices that connect to the USB. These devices include webcam (camera) 150, infrared (IR) receiver 148, keyboard and trackpad 144, and Bluetooth device 146, which provides for wireless personal area networks (PANs). USB Controller 140 also provides USB connectivity to other miscellaneous USB connected devices 142, such as a mouse, removable nonvolatile storage device 145, modems, network cards, ISDN connectors, fax, printers, USB hubs, and many other types of USB connected devices. While removable nonvolatile storage device 145 is shown as a USB-connected device, removable nonvolatile storage device 145 could be connected using a different interface, such as a Firewire interface, etcetera.

Wireless Local Area Network (LAN) device 175 connects to Southbridge 135 via the PCI or PCI Express bus 172. LAN device 175 typically implements one of the IEEE 802.11 standards of over-the-air modulation techniques that all use the same protocol to wireless communicate between information handling system 100 and another computer system or device. Optical storage device 190 connects to Southbridge 135 using Serial ATA (SATA) bus 188. Serial ATA adapters and devices communicate over a high-speed serial link. The Serial ATA bus also connects Southbridge 135 to other forms of storage devices, such as hard disk drives. Audio circuitry 160, such as a sound card, connects to Southbridge 135 via bus 158. Audio circuitry 160 also provides functionality such as audio line-in and optical digital audio in port 162, optical digital output and headphone jack 164, internal speakers 166, and internal microphone 168. Ethernet controller 170 connects to Southbridge 135 using a bus, such as the PCI or PCI Express bus. Ethernet controller 170 connects information handling system 100 to a computer network, such as a Local Area Network (LAN), the Internet, and other public and private computer networks.

While FIG. 1 shows one information handling system, an information handling system may take many forms. For example, an information handling system may take the form of a desktop, server, portable, laptop, notebook, or other form factor computer or data processing system. In addition, an information handling system may take other form factors such as a personal digital assistant (PDA), a gaming device, ATM machine, a portable telephone device, a communication device or other devices that include a processor and memory.

The Trusted Platform Module (TPM 195) shown in FIG. 1 and described herein to provide security functions is but one example of a hardware security module (HSM). Therefore, the TPM described and claimed herein includes any type of HSM including, but not limited to, hardware security devices that conform to the Trusted Computing Groups (TCG) standard, and entitled "Trusted Platform Module (TPM) Specification Version 1.2." The TPM is a hardware security subsystem that may be incorporated into any number of information handling systems, such as those outlined in FIG. 2.

Figure 2:
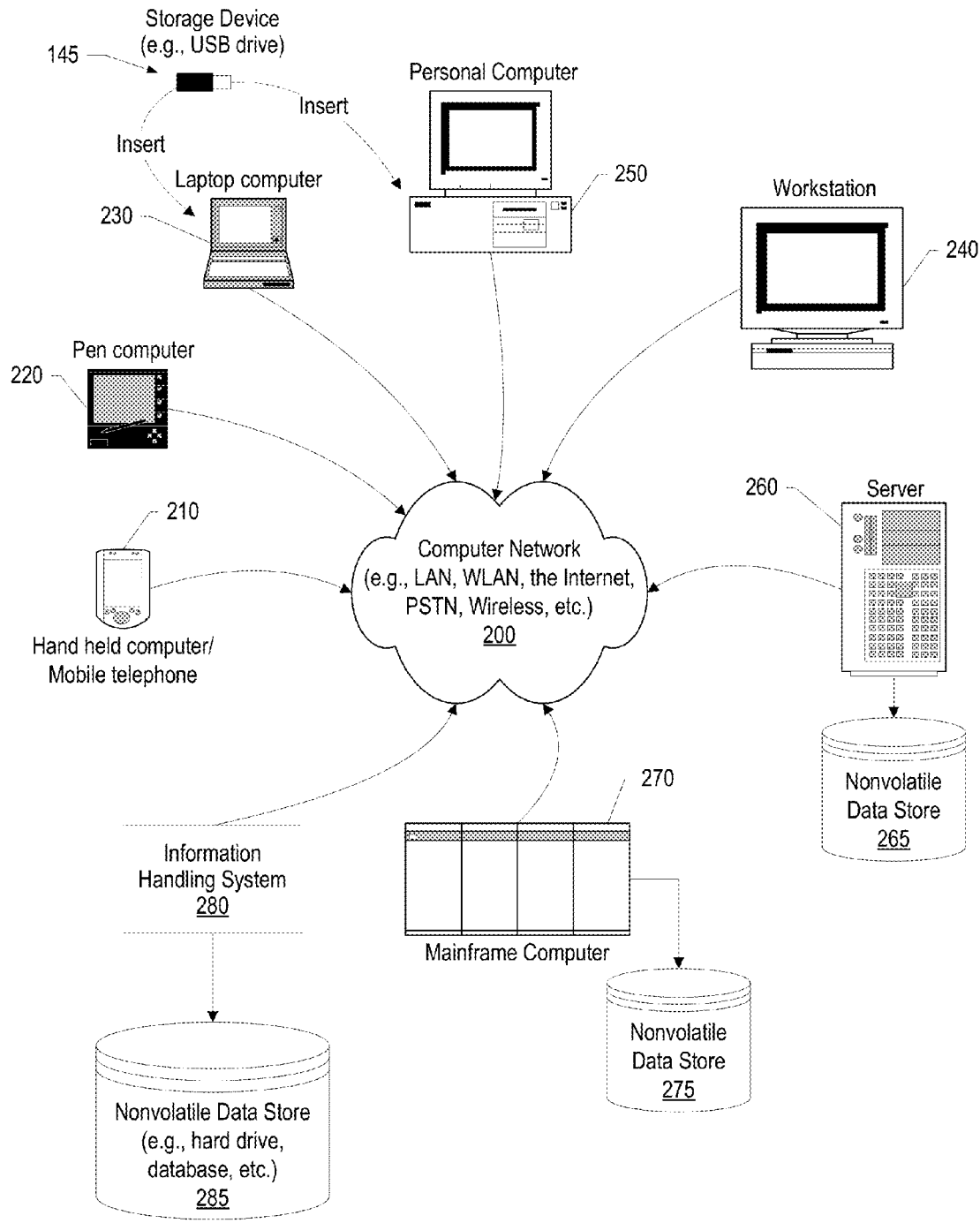
FIG. 2 provides an extension of the information handling system environment shown in FIG. 1 to illustrate that the methods described herein can be performed on a wide variety of information handling systems which operate in a networked environment.

FIG. 2 provides an extension of the information handling system environment shown in FIG. 1 to illustrate that the methods described herein can be performed on a wide variety of information handling systems that operate in a networked environment. Types of information handling systems range from small handheld devices, such as handheld computer/mobile telephone 210 to large mainframe systems, such as mainframe computer 270. Examples of handheld computer 210 include personal digital assistants (PDAs), personal entertainment devices, such as MP3 players, portable televisions, and compact disc players. Other examples of information handling systems include pen, or tablet, computer 220, laptop, or notebook, computer 230, workstation 240, personal computer system 250, and server 260. Other types of information handling systems that are not individually shown in FIG. 2 are represented by information handling system 280. As shown, the various information handling systems can be networked together using computer network 200. Types of computer network that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. Some of the information handling systems shown in FIG. 2 depicts separate nonvolatile data stores (server 260 utilizes nonvolatile data store 265, mainframe computer 270 utilizes nonvolatile data store 275, and information handling system 280 utilizes nonvolatile data store 285). The nonvolatile data store can be a component that is external to the various information handling systems or can be internal to one of the information handling systems. In addition, removable nonvolatile storage device 145 can be shared among two or more information handling systems using various techniques, such as connecting the removable nonvolatile storage device 145 to a USB port or other connector of the information handling systems.

FIGS. 3-6 depict an approach that can be executed on an information handling system and computer network as shown in FIGS. 1-2. A system and method that controls the information displayed at an augmented reality device, such as in a heads-up-display (HUD) is described. In this approach, a user uses an augmented reality device that displays information related to the user's current environment or surroundings, such as information pertaining to local businesses. Biometric input devices, such as a heart beat rate monitor, a blood pressure monitor, a perspiration monitor, a brain wave monitor, and a muscle tension monitor collect biometric data from the user with the biometric data being received as biometric values. Prior to utilizing the augmented reality device, the user configures biometric input ranges, such as the user's "normal" biometric range and other ranges. A normal biometric range would be where the user's heart rate and/or other biometric inputs indicate that the user is functioning normally without stresses, etc. that would elevate or change the biometric input values. Display policies are configured based on the user's preferences and the biometric input range detected from the user. For example, if the user's biometric data indicates that the user is experiencing a normal biometric function (heart rate, etc.), then the augmented reality device might display ample information about businesses that appear within the user's field of vision. This ample information might include the business name, address, telephone number, review information, and the like. However, if the biometric input device detects that the user is stressed (e.g., elevated heart rate, etc.), then the augmented reality device might use a display policy where less information is displayed about the nearby businesses, such as just the name and telephone number. Consequently, the reduced amount of information might be better processed by the user when in a stressful situation. In a further embodiment, the approach can identify an alternate service that might be useful to the user based on the user's biometric input readings and display information about the availability of such services. For example, if the user is experiencing a high-level of stress and a biometric input device detects a high level of muscle tension, the augmented reality device could display information regarding nearby massage therapists that might be available to aid the user and provide stress-relief therapy. The approach discussed above is further described in FIGS. 3-6 and accompanying detailed descriptions, discussed below. These figures and related descriptions provide further details related to one or more embodiments that utilize various data sources to control the information displayed to the user by an augmented reality device.

FIG. 3 is a depiction of information at an augmented reality device being reduced based on a user's configuration settings. View 300 depicts the augmented reality device display (e.g., a heads-up-display (HUD) that appears to the user, etc.) when the biometric input devices detect that the user's biometric readings (e.g., heart rate, blood pressure, etc.) are at previously established "normal" levels. As shown, ample information is displayed that corresponds to businesses currently being viewed by the user. In the example, the information displayed includes the business name as well as metadata about the business such as when the business was established, specific address of the business, telephone number of the business, and other metadata such as the rating, or reputation, of a business as well as current sales information that may be of interest to the user.

Conversely, view 310 depicts the augmented reality device display when the biometric input devices detect that the user's biometric readings are at previously established "increased" levels that indicate that the user is experiencing stress (e.g., increased heart rate, increased blood pressure, etc.). In view 310, a reduced amount of information is displayed to the user so that the user will be less likely to experience "information overload" and will be able to adequately process the displayed information. Here, only the business name and address are displayed on the augmented reality device. The reduced amount of information may allow the user to better process the information displayed by the augmented reality device and assist the user in making decisions or analyzing the user's current situation. When the biometric input devices indicate that the user's stress level has returned to a normal level, then the increased information shown in view 300 would be displayed to the user on the augmented reality device display.

Figure 4:
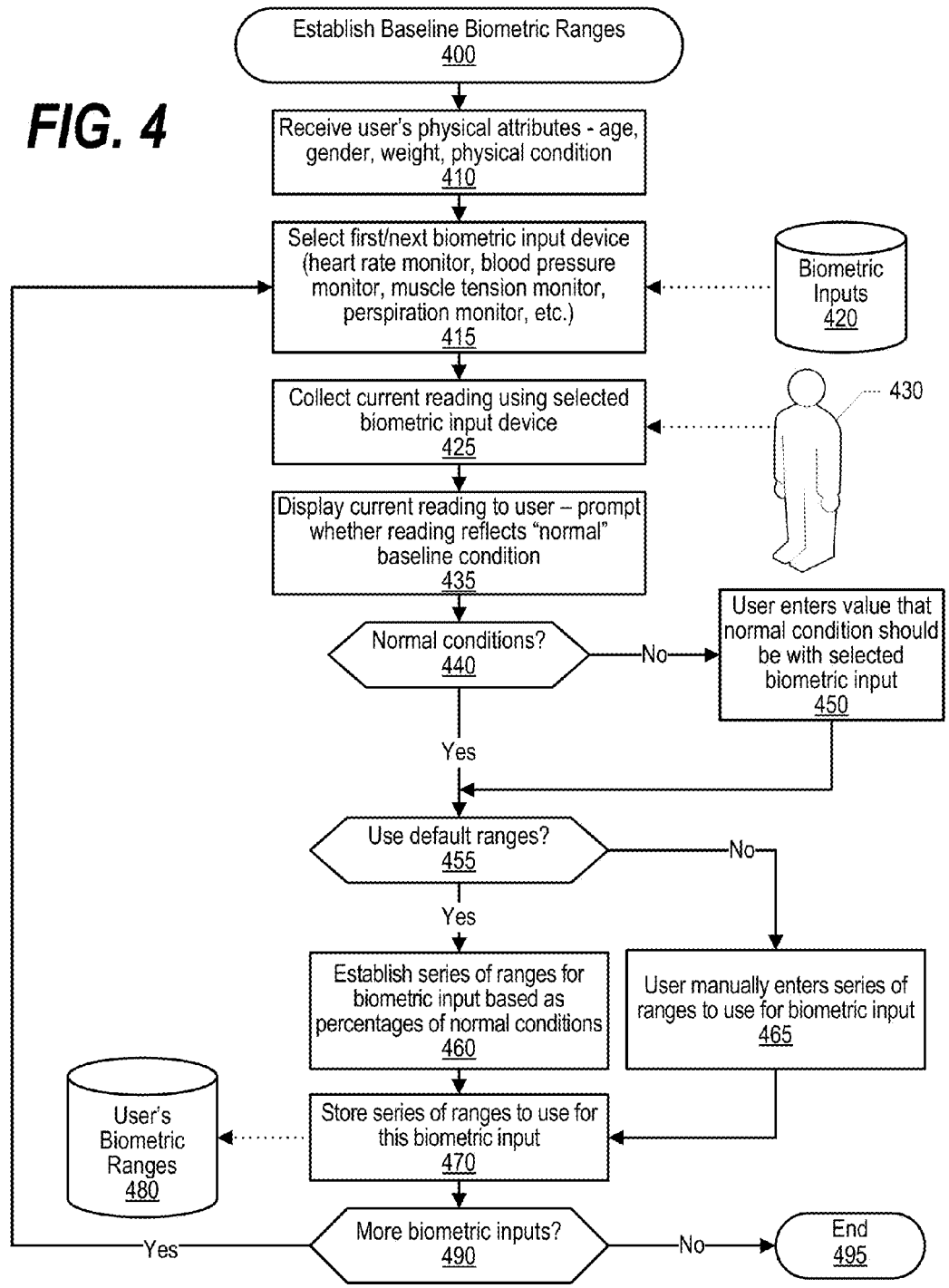
FIG. 4 is a depiction of a flowchart showing the logic used to establish baseline biometric ranges used to control information displayed at the augmented reality device.

FIG. 4 is a depiction of a flowchart showing the logic used to establish baseline biometric ranges used to control information displayed at the augmented reality device. Processing performed to establish baseline biometric ranges commences at 400 whereupon, at step 410, the process receives the user's physical attributes at an input device, such as a keyboard. The user's physical attributes would include attributes such as the user's age, gender, weight, and general physical condition (e.g., extremely athletic, athletic, moderately athletic, sedentary, etc.). At step 415, the process selects biometric input device from data store 420. Biometric input devices that can be used to monitor the user's biometric data include devices such as a heart rate monitor, a blood pressure monitor, a muscle tension monitor, a perspiration monitor, a brain wave monitor etc. At step 425, the process collects a current reading using selected biometric input device with the current reading returning a biometric value from the biometric input device that is monitoring user 430. At step 435, the process displays the current reading and prompts the user as to whether the current reading appears to reflect a "normal" baseline reading of the user. In one embodiment, the user is asked to establish the baseline biometric ranges when the user is in a normal setting and is not experiencing elevated biometric readings that would indicate a stressful situation.

A decision is made as to whether the user is in a normal setting or if the current readings of the biometric input device appear to represent a normal reading for the user (decision 440). If the current readings do not appear to represent a normal reading for the user, then decision 440 branches to the "no" branch whereupon, at step 450, the user is prompted as to what a "normal" reading for the selected biometric input device should be for the user. For example, if the user's normal pulse is 75 but the heart rate monitor indicates that the user's current pulse is 90, then the user can enter "75" to indicate that a normal biometric value from the heart rate monitor would be 75 beats per minute. On the other hand, if the current readings from the selected biometric input device reflect a normal reading for the user, then the user indicates that the reading is an accurate reflection of the user's normal reading and decision 440 branches to the "yes" branch bypassing step 450.

A decision is made as to whether the user wishes to use default sets of biometric input ranges or would like to enter the sets of biometric input ranges (decision 455). If default ranges are being used, then decision 455 branches to the "yes" branch whereupon, at step 460, the process establishes a set of biometric input ranges for the selected biometric input device based as percentages of the user's normal reading for the selected biometric input device. For example, a ten percent deviation from the normal biometric value could be established for the normal range, with a range established above the normal range as being stressed, and a range established below the normal range as being tired or lethargic. On the other hand, if the user wishes to manually establish the sets of biometric input ranges, then decision 455 branches to the "no" branch whereupon, at step 465, the process receives a series of biometric input ranges from the user (e.g., from a keyboard or keypad device, etc.).

At step 470, the sets of biometric input ranges that have been established are stored in data store 480. A decision is made as to whether there are additional biometric input devices used by the augmented reality device for which biometric ranges need to be established (decision 490). If there are more biometric input devices, then decision 490 branches to the "yes" branch which loops back to select the next biometric input device and establish the "normal" range and other ranges which are stored in data store 480. This looping continues until all of the biometric input devices utilized by the augmented reality device have been processed, at which point decision 490 branches to the "no" branch and processing to establish baseline biometric ranges used to control information displayed at the augmented reality device ends at 495.

Figure 5:
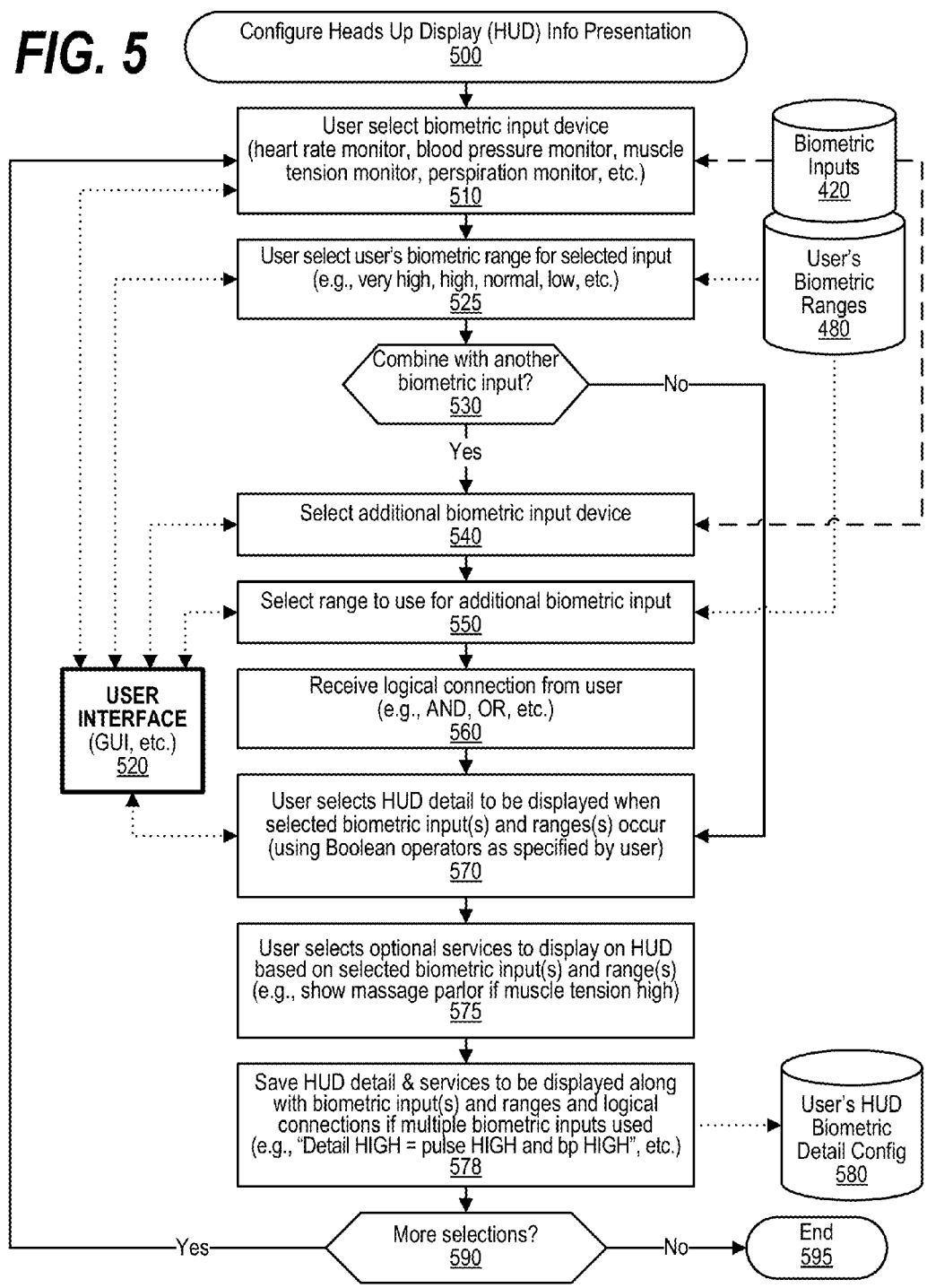
FIG. 5 is a depiction of a flowchart showing the logic used in configuring the information displayed at the augmented reality device in response to the user's biometric readings.

FIG. 5 is a depiction of a flowchart showing the logic used in configuring the information displayed at the augmented reality device in response to the user's biometric readings. Processing used to configure the information that is displayed to the user of the augmented reality device commences at 500 whereupon, at step 510, the user selects one of the configured biometric input devices from data store 420 using user interface 520, such as a graphic user interface (GUI). Biometric input devices can includes devices such as a heart rate monitor, a blood pressure monitor, a muscle tension monitor, a perspiration monitor, a brain wave monitor etc. At step 525, the user selects an established biometric input range from the set of previously established biometric input ranges (see FIG. 4) from data store 480 utilizing user interface 520. For example, the user might select a heart rate monitor device and the "normal" range.

A decision is made as to whether the user wishes to combine the selected biometric input device readings with the readings from another biometric input device (decision 530). For example, the user may wish to configure a display policy for when the user's heart rate is in the "normal" category, but the perspiration monitor is in a "heavy" or "stressed" category that might indicate that the user is becoming over-heated with the display policy configured to display information that might be more useful to providing the user with relief from an over-heated state, such as information about air conditioned restaurants that might offer the user a comfortable place to hydrate and achieve a lower body temperature. If the user is establishing a display policy that utilizes more than one biometric input device, then decision 530 branches to the "yes" branch whereupon, at step 540, the user selects an additional biometric input device from data store 420 using user interface 520. At step 550, the user selects a pre-established range to use for the additional biometric input (e.g., "stressed," "over-heated," etc.). At step 560, the user provides a logical Boolean connection to use with the two selected biometric input devices and input ranges (e.g., "AND", "OR", etc.). Using the example above, the user could specify that the display policy should be used when the user's heart rate is in a "normal" range AND the perspiration level is in a "high" or other elevated range. Likewise, the user could establish a display policy that is used when the user's heart rate is in a "normal" range "OR" the perspiration level is in a "high" range. Returning to decision 530, if readings from the selected biometric input device are not being used in conjunction with readings from another biometric input, then decision 530 branches to the "no" branch bypassing steps 540 through 560.

At step 570, the user utilizes user interface 520 and selects the detail that will be displayed by the augmented reality device for the display policy that is being configured. For example, the user could select to view minimal data (e.g., business names and addresses only, etc.) when configuring a display policy to use when the user is stressed, and might configure a display policy that displays more detail when the user's biometric values indicate that the user is in a "normal" range.

At step 575, the user can select optional services identifying an alternate personal service pertaining to the user based on the received biometric value. For example, if a muscle tension monitoring device indicates that the user's muscles are tense, the augmented reality device could be set to display locations of nearby massage therapists that could be contacted to address the user' tense muscle condition.

At step 578, the process saves the configured display policy along with any optional personal services to be displayed along with biometric input(s) and ranges and any logical connections if multiple biometric inputs used. The data is stored in data store 580. For example, the display policy might be to display "Detail HIGH=pulse HIGH AND by HIGH", to provide high level of detail when both the pulse level is high and the user's blood pressure is high.

A decision is made as to whether the user wishes to configure additional display policies (decision 590). If the user wishes to configure additional display policies, then decision 590 branches to the "yes" branch which loops back to select the next set of biometric input device(s), range(s) and display detail to use for the next display policy. This looping continues until the user has configured all desired display policies, at which point decision 590 branches to the "no" branch whereupon processing used to configure the information that is displayed to the user of the augmented reality device ends at 595.

Figure 6:
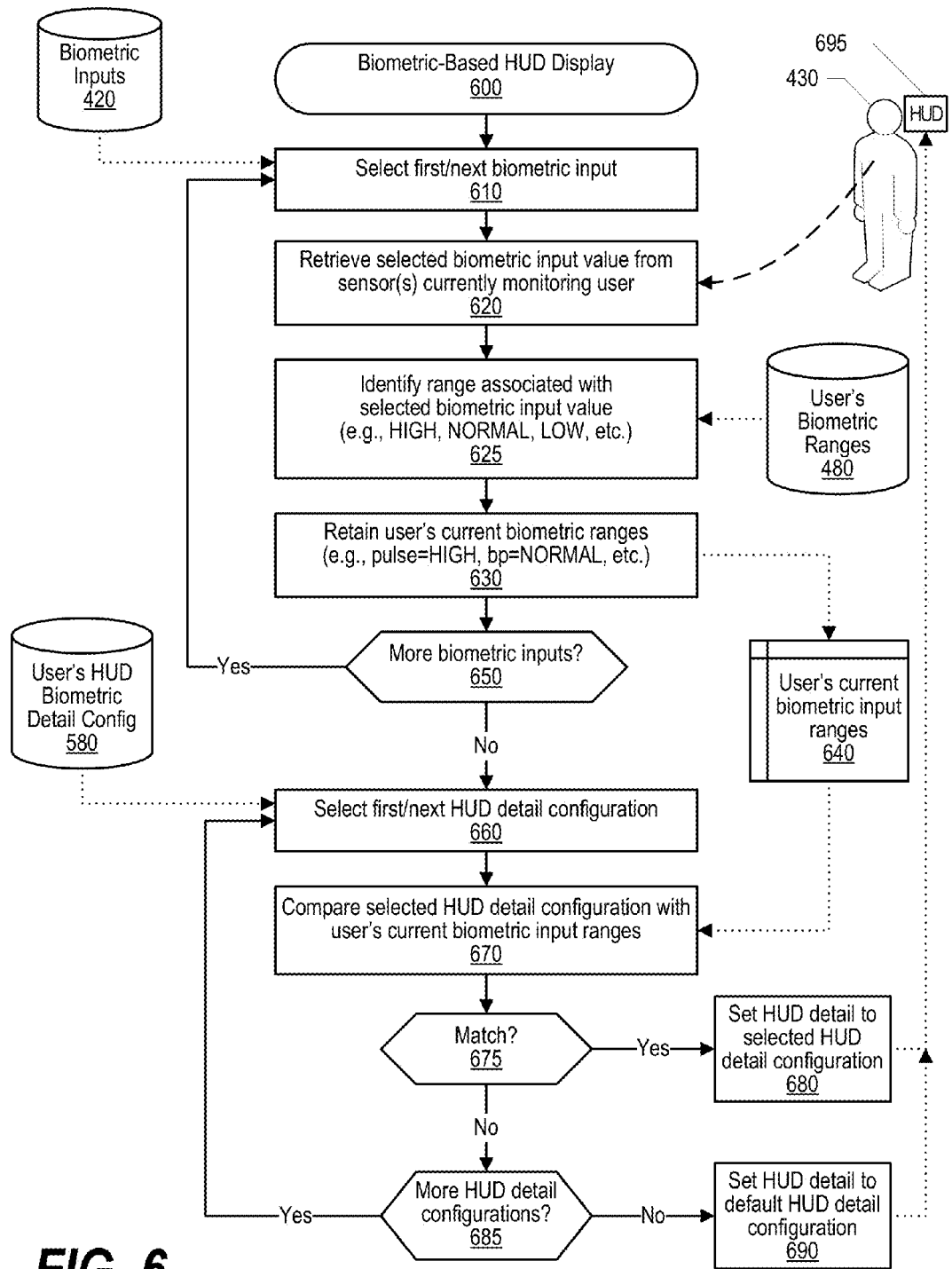
FIG. 6 is a depiction of a flowchart showing the logic used in the biometric-based augmented reality device to display additional data to the user based on the user's current biometric readings.

FIG. 6 is a depiction of a flowchart showing the logic used in the biometric-based augmented reality device to display additional data to the user based on the user's current biometric readings. Processing performed when the user is using the augmented reality device commences at 600 whereupon, at step 610, the process selects the first biometric input device from data store 420. At step 620, the process receives the biometric input value from the selected biometric input device that is currently monitoring user 430. At step 625, the user's current biometric input value is compared with the previously established sets of biometric input ranges to identify the biometric input range currently being experienced by the user (e.g., "high," "normal," "low," "stressed," etc.). The previously established sets of biometric input ranges are retrieved from data store 480. At step 630, the user's current biometric input range as identified in step 625 for the selected biometric input device is stored in memory area 640.

A decision is made as to whether there are additional biometric input devices from which biometric input values and ranges should be retrieved (decision 640). If there are more biometric input devices to process, then decision 650 branches to the "yes" branch which loops back to select the next biometric input device and identify the biometric input range currently being experienced by the user as described above with the data being added to memory area 640. This looping continues until all of the biometric input devices have been processed, at which point decision 650 branches to the "no" branch for further processing.

At step 660, the first display policy is selected from configuration data store 580. The display policies were previously configured by the user as shown in FIG. 5. At step 670, the selected biometric input ranges corresponding to the selected display policy are compared with the current biometric input ranges being experienced by the user and stored in memory area 640. A decision is made as to whether the selected display policy matches the user's current biometric input ranges (decision 675). If the selected display policy matches the user's current biometric input ranges, then decision 675 branches to the "yes" branch whereupon, at step 680, a display detail is automatically set in the augmented reality device according to the selected display policy. In addition, information regarding any optional personal services that correspond with the display policy are also set so that, for example, the user might be directed to a personal service, such as a massage therapist, in response to a biometric input (e.g., high muscle tension, etc.), matching a personal service configuration previously set by the user. As shown, the display (e.g., HUD 695) of the user's augmented reality device is set to display the display level according to the selected display policy.

Returning to decision 675, if the selected display policy does not match the user's current biometric input ranges, then decision 675 branches to the "no" branch whereupon a decision is made as to whether there are additional display policies that have been configured that need to be evaluated as described above (decision 685). If there are additional display policies to evaluate, then decision 685 branches to the "yes" branch which loops back to select and evaluate the next display policy as described above. This looping continues until either a match is found (with decision 675 branching to the "yes" branch) or until all of the display policies have been evaluated without finding a match, at which point decision 685 branches to the "no" branch whereupon, at step 690, the display detail is automatically set to a default display policy in the augmented reality device according to the default settings. The processing shown in FIG. 6 would be repeated periodically (e.g., every minute, etc.) so that the display policy utilized by the augmented reality device can be changed when user's biometric values change, indicating that the user is exhibiting a different set of biometric inputs.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While particular embodiments of the present invention have been shown and described, it will be obvious to those skilled in the art that, based upon the teachings herein, that changes and modifications may be made without departing from this invention and its broader aspects. Therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. An information handling system that includes an augmented reality device comprising:
   one or more processors;
   a memory coupled to at least one of the processors;
   a heads-up-display (HUD) accessible by at least one of the processors;
   a digital camera; and
   a set of instructions stored in the memory and executed by at least one of the processors, wherein the set of instructions perform steps of:
      receiving a biometric value from a biometric input device receiving biometric data from a user of the augmented reality device;
      comparing the biometric value to a plurality of previously established biometric input ranges corresponding to the user, wherein each of the biometric input ranges corresponds to one of a plurality of display policies, and wherein the comparison results in a selected display policy; and
      displaying information to the user via the augmented reality device, wherein an amount of information displayed and a type of information displayed are based on the selected display policy.

2. The information handling system of claim 1 further comprising:
   configuring, by the user, the plurality of established biometric input ranges and the plurality of display policies prior to the reception of the biometric value.

3. The information handling system of claim 1 wherein each of the biometric input ranges has an upper biometric value and a lower biometric value, and wherein the steps performed further comprise:
   selecting one of the biometric input ranges as a normal input range for the user.

4. The information handling system of claim 1 wherein the biometric input device is selected from a group consisting of a heart beat rate monitor, a blood pressure monitor, a perspiration monitor, a brain wave monitor, and a muscle tension monitor.

5. The information handling system of claim 1 wherein the biometric input device includes a plurality of biometric input devices that receive a plurality of biometric values, one of the biometric values being the biometric value, and wherein the steps performed further comprise:
   identifying the selected display policy by comparing the plurality of biometric values with a plurality of previously established sets of biometric input ranges, wherein each of the sets of biometric input ranges are logically associated with a Boolean connector.

6. The information handling system of claim 1 wherein the steps performed further comprise:
   identifying an alternate personal service pertaining to the user based on the received biometric value;
   retrieving information pertaining to one or more proximate service providers that provide the identified alternate personal service; and
   displaying the retrieved information to the user via the augmented reality device.

7. The information handling system of claim 1 wherein each of the display policies are differentiated from the other display policies based on one or more factors selected from a group consisting of the amount of information displayed and the type of information displayed.

8. A computer program product stored in a non-transitory computer readable medium, comprising computer instructions that, when executed by an information handling system, causes the information handling system to perform actions comprising:
   receiving a biometric value from a biometric input device receiving biometric data from a user of the augmented reality device;
   comparing the biometric value to a plurality of previously established biometric input ranges corresponding to the user, wherein each of the biometric input ranges corresponds to one of a plurality of display policies, and wherein the comparison results in a selected display policy; and
   displaying information to the user via the augmented reality device, wherein an amount of information displayed and a type of information displayed are based on the selected display policy.

9. The computer program product of claim 8 wherein the actions further comprise:
   configuring, by the user, the plurality of established biometric input ranges and the plurality of display policies prior to the reception of the biometric value.

10. The computer program product of claim 8 wherein each of the biometric input ranges has an upper biometric value and a lower biometric value, and wherein the actions further comprise:
    selecting one of the biometric input ranges as a normal input range for the user.

11. The computer program product of claim 8 wherein the biometric input device is selected from a group consisting of a heart beat rate monitor, a blood pressure monitor, a perspiration monitor, a brain wave monitor, and a muscle tension monitor.

12. The computer program product of claim 8 wherein the biometric input device includes a plurality of biometric input devices that receive a plurality of biometric values, one of the biometric values being the biometric value, and wherein the actions further comprise:
    identifying the selected display policy by comparing the plurality of biometric values with a plurality of previously established sets of biometric input ranges, wherein each of the sets of biometric input ranges are logically associated with a Boolean connector.

13. The computer program product of claim 8 wherein each of the display policies are differentiated from the other display policies based on one or more factors selected from a group consisting of the amount of information displayed and the type of information displayed, and wherein the actions further comprise:
    identifying an alternate personal service pertaining to the user based on the received biometric value;
    retrieving information pertaining to one or more proximate service providers that provide the identified alternate personal service; and
    displaying the retrieved information to the user via the augmented reality device.

* * * * *